March 3, 1942.  R. F. BANNOW  2,275,291
MACHINE TOOL OPERATING AT UNIVERSAL ANGLES IN OVERALL LOCATIONS
Filed April 4, 1939  3 Sheets-Sheet 1
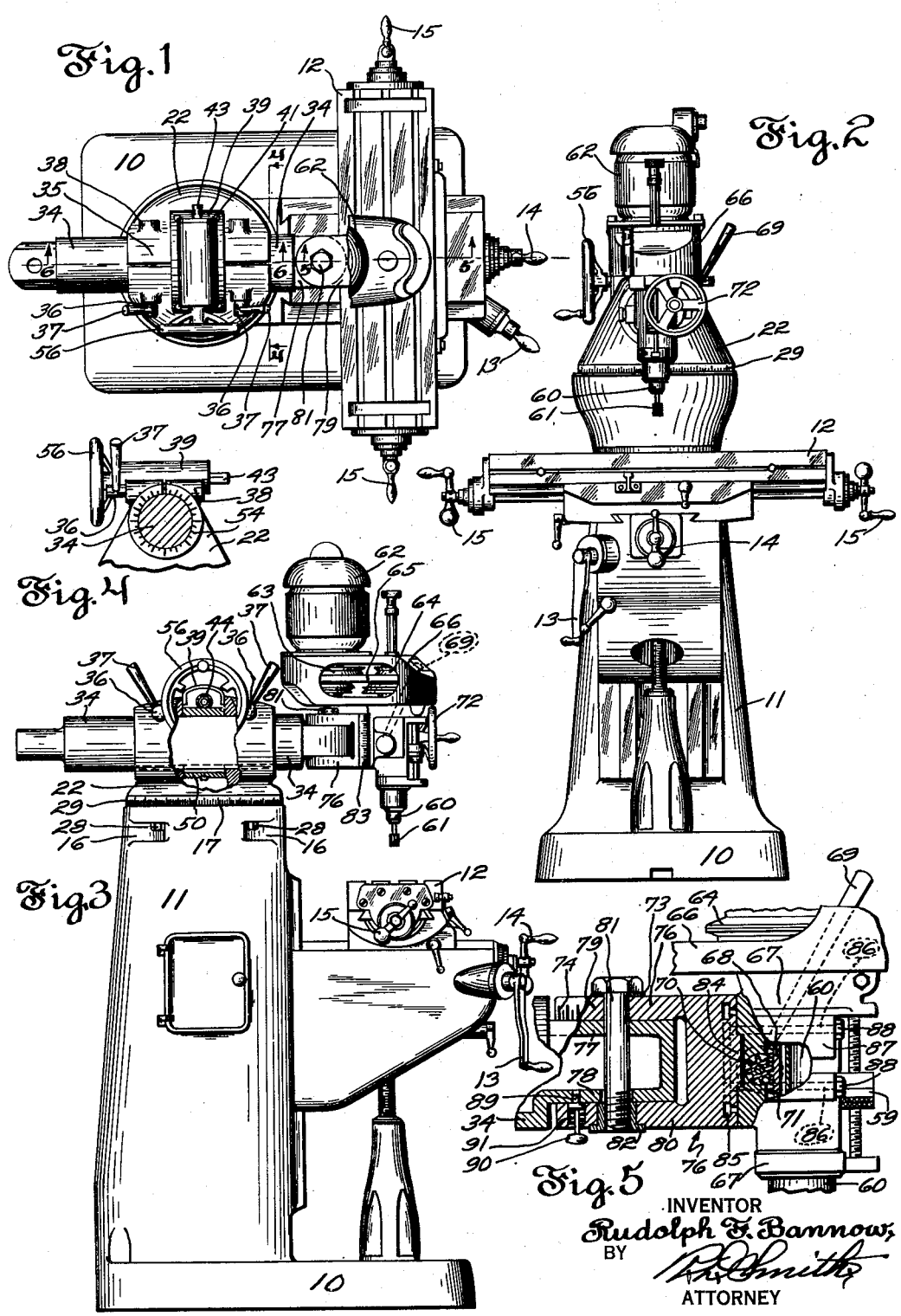
INVENTOR
Rudolph F. Bannow,
BY
ATTORNEY March 3, 1942.  R. F. BANNOW  2,275,291
MACHINE TOOL OPERATING AT UNIVERSAL ANGLES IN OVERALL LOCATIONS
Filed April 4, 1939  3 Sheets-Sheet 2
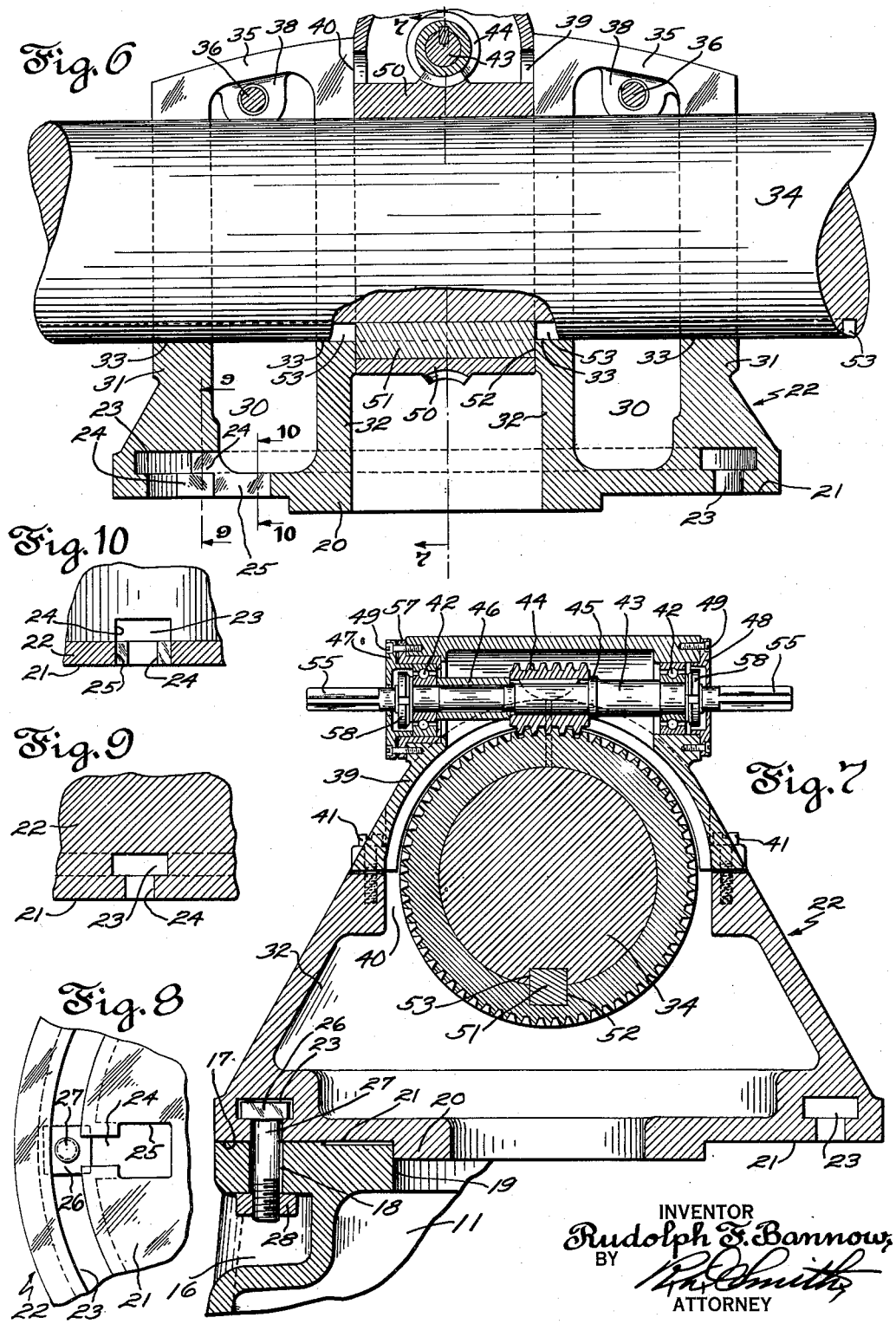
INVENTOR
Rudolph F. Bannow,
BY
ATTORNEY March 3, 1942.   R. F. BANNOW   2,275,291
MACHINE TOOL OPERATING AT UNIVERSAL ANGLES IN OVERALL LOCATIONS
Filed April 4, 1939   3 Sheets-Sheet 3
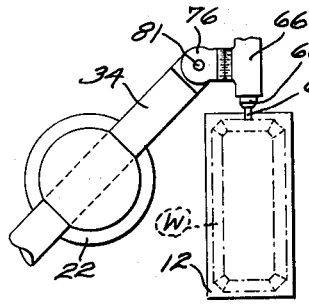
Fig. 13
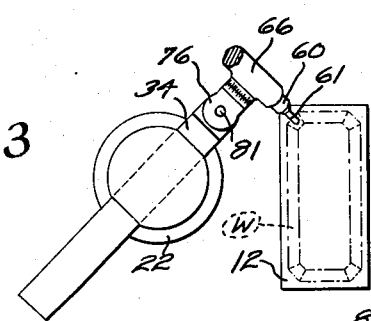
Fig. 14
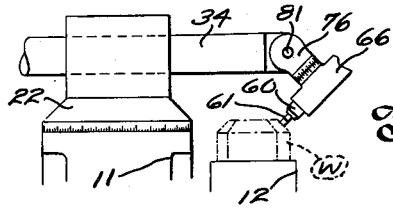
Fig. 17
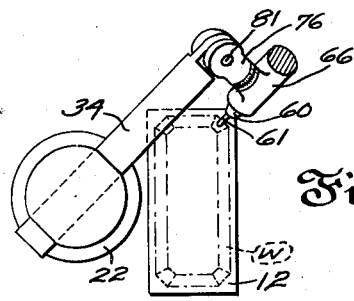
Fig. 15
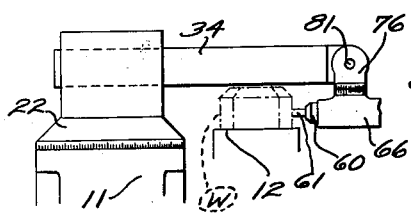
Fig. 18
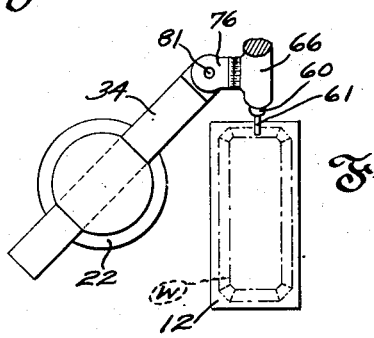
Fig. 16
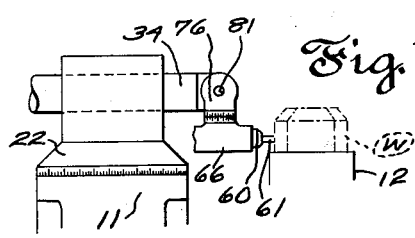
Fig. 19
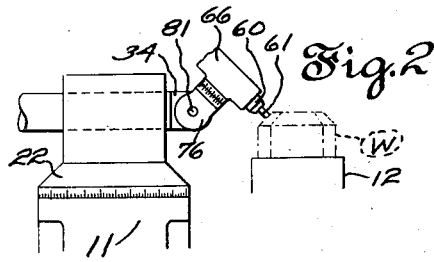
Fig. 20
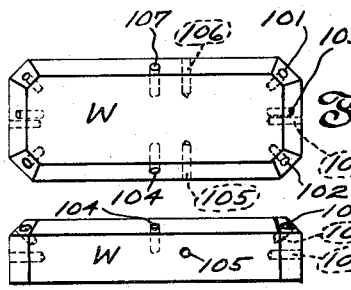
Fig. 11
Fig. 12
INVENTOR
Rudolph F. Bannow,
BY
ATTORNEY Patented Mar. 3, 1942

2,275,291

UNITED STATES PATENT OFFICE 2,275,291

MACHINE TOOL OPERATING AT UNIVERSAL ANGLES IN OVERALL LOCATIONS

Rudolph F. Bannow, Bridgeport, Conn.

Application April 4, 1939, Serial No. 265,897

23 Claims. (Cl. 90—17)

This invention relates to machine tools of the general type adapted to perform milling, cutting, boring, grinding and like machining operations, by advancing an appropriate powered tool with respect to the work, as well as by feeding the work relative to the tool, and particularly concerns machine tools of the horizontal milling machine type involving a table that is mounted for selectively feeding the work in any of three different paths of movement with respect to the upright column or tool supporting frame standard of the machine.

By way of explaining the objects of the invention, it may be mentioned that the conventional milling machine is composed of an upright frame standard forwardly of which the work support table is movably positioned. For feeding the work, the work table is adjustably slidable up and down, backward and forward, and from side to side of the standard. Mounted on the standard at a higher level than the work table is usually a horizontally extending overarm. There may be supported on such overarm and above or adjacent the work table, a self-powered work machining unit including a tool spindle and the motor by which it is powered.

Heretofore in machine tools of this character various provisions have been made for bodily holding and adjusting such work machining unit, but all such former provisions have so restricted the possible stations to which the unit may be moved, and have so restricted the directions in which the tool spindle may be inclined and advanced to perform its operations upon the work that many frequently desired machining operations have heretofore been impossible, or at best have required changing the setup of the work on its support table, an operation which greatly slows up production and increases the likelihood of inaccuracy in the finished work.

An object of this invention is to provide means for so adjustably supporting and positioning the work machining unit that its tool spindle may operate on extreme end portions of a long piece of work when the work support table is positioned centrally of its range of lengthwise horizontal feeding travel from side to side of the standard. This makes it unnecessary to move a long heavy piece of work to a position of unbalance wherein most of its weight falls on one side of the means of support for the work table as has heretofore been necessary for the purpose of bringing one end of the work to a position nearly in front of the machine standard to enable it to be reached by the tool of the adjustable machining unit.

Another object of the invention is to provide joints so arranged between different sections of an articulated support structure for the work machining unit that its tool spindle may be held and guided for axial movement toward the work at any desired angular inclination in any of the above mentioned positions thus giving to the machining unit a universal ability to perform its cutting or other operations free from many restrictions and limitations that have heretofore handicapped users of this type of machine tool, and slowed down the possible rate of production.

A further object of the invention is to mount a self powered work machining unit upon the overarm of a machine tool of the milling machine type by means of improved forms and arrangements of articulated support structure sections and joints connecting the same.

A further object of the invention is to provide improved mechanism for rotatively shifting an overarm or the like about its own axis to a measurable degree and then effectively holding and supporting it in the position to which it has been shifted, while leaving the overarm free to be shifted longitudinally also with respect to the machine standard or with respect to a turret head mounted to swivel thereon.

A still further object is to provide improved construction for rotatively mounting a turret head on the top of a machine standard and holding it in its adjusted positions.

The foregoing and other purposes of these improvements will be understood in greater detail from the following description of a preferred and illustrative embodiment of the invention, in which description reference is had to the accompanying drawings, wherein:

Figs. 1, 2 and 3, respectively, are a plan view, a front view and a side view of a complete machine tool embodying the present improvements, a section of the external parts being broken away in Fig. 1 to expose certain interior parts.

Fig. 4 is a fragmentary view taken in section on the plane 4—4 in Fig. 1 looking in the direction of the arrows.

Fig. 5 is a fragmentary view taken in section on the planes 5—5—5 in Fig. 1 looking in the direction of the arrows.

Fig. 6 is an enlarged fragmentary view taken in section on the plane 6—6 in Fig. 1 looking in the direction of the arrows.

Fig. 7 is a view on the same scale as Fig. 6 taken in section on the plane 7—7 in Fig. 6.

Fig. 8 is a fragmentary bottom plan view looking upwardly at the region of the bottom surface of the turret head which appears at the extreme left in Fig. 6.

Fig. 9 is a fragmentary view taken in section on the plane 9—9 in Fig. 6 looking in the direction of the arrows.

Fig. 10 is a fragmentary view taken on the plane 10—10 in Fig. 6 looking in the direction of the arrows.

Figs. 11 and 12 are respectively plan and edgewise views of an elongated piece of work illustrating locations and angular dispositions of holes that may be bored therein by the machining tool of these improvements.

Figs. 13 to 16, inclusive, represent diagrammatically and in plan view variously adjusted setups of the articulated structure for supporting the machining unit enabling the tool of the latter to bore certain of the holes in the piece of work which are indicated in Figs. 11 and 12.

Figs. 17 to 20, inclusive, represent diagrammatically and in side elevation still differently adjusted setups of the articulated structure for supporting the machining unit enabling the tool to bore still others of the holes in the piece of work which are indicated in Figs. 11 and 12.

Conventional parts of a horizontal milling machine as appearing in Figs. 1, 2 and 3, include a base 10, a frame standard 11, and a work table 12. This table may be shifted to and held in various vertical positions by usual screw means operated by the handle 13 and may also be shifted backward and forward, toward and away from, the frame standard in Fig. 2 by screw means operated by the handle 14, and may also be shifted from side to side of the frame standard in Fig. 2 by screw means operated by either of the handles 15. The above mentioned and other table holding and operating parts of the machine as shown in the drawings may be conventional and do not require explanation.

The frame standard 11 may be hollow and is provided with lateral walls having a number of niches 16 sunken inwardly thereof and spaced from the top surface 17 of the standard. A clearance hole 18 for the shank of a fastening bolt extends from each niche and opens upwardly through surface 17. Surface 17 is further interrupted by a large bearing bore 19 centrally located in the top of the standard and rotatively fitted by the central circular boss 20 which projects below the bottom surface 21 of the turret head 22. Surface 21 seats on surface 17, and thus the turret head 22 is mounted upon the frame standard 11 in a way to swivel about a vertical axis to any rotative position through a full 360 degrees.

For holding the turret head securely in each of the unlimited number of positions to which it may be turned on the frame standard, an annularly continuous T-shaped groove 23 opens through the bottom surface 21 of the turret head and registers with each of the bolt holes 18 in the top of frame standard 11. To provide for the introduction of bolt heads into groove 23 without so interrupting the continuity thereof that a bolt head might drop out, a T-shaped passageway 24 is provided as shown in Fig. 9 and extends laterally inward from groove 23 and is of size and shape corresponding thereto in cross section. Passageway 24 communicates with a vertically extending opening 25 which, as best shown in Fig. 8, is spaced laterally inward from the annular groove 23 and is of a size and shape to admit the head 26 of the bolt 27 upwardly therethrough from the bottom surface 21 of turret head 22 and into the passageway 24, after which the bolt head may be shoved laterally into and along the annular groove 23 to any necessary position on the circle for finding and entering any hole 18 in the top of the frame standard. A nut 28 having threaded engagement with the bolt is accommodated in each of the niches 16 by means of which the turret head is immovably drawn downwardly and firmly clamped in its rotatively adjusted positions on the frame standard. Angular movement and positions of the turret head 22 may be accurately measured and known by the scale of graduations 29 about the bottom rim of the turret head (Fig. 4), to register with which the frame standard may carry a "zero" or index mark.

For eliminating unnecessary weight, the turret head may be hollow and contain interior compartments 30 located between each of two end walls 31 and each of two partition walls 32. Horizontally aligned coaxial bores 33 through the walls 31 and 32 provide bearings for a sturdy elongated cylindrical overarm 34 and so support this arm that it may rotate through a full 360 degrees in said bearings or slide lengthwise therethrough. The crown wall 35 and the top portions of walls 32 and 32 are slotted in a vertical plane centrally and lengthwise of the overarm 34 to provide a split enabling the side halves of the crown wall to be sprung together for causing upper portions of the partition walls 31 and 32 tightly to clamp the overarm 34 and hold it immovable in the turret head. For contracting the split portion of the crown wall, draw bolts 36 having handles 37 pass through clearance holes in one side of the split crown wall and have threaded engagement with lugs 38, respectively, on the other side of the split in the crown wall.

Between the partition walls 32, 32 the crown wall 35 of the turret head is provided with a cutout 40 accommodating a rather narrow cap member 39 of arched shape conforming in general to the exterior contour of the crown wall and filling the width of the cutout therein. The cap member 39 is removably fastened to the turret head by holding screws 41, and is bored out in a horizontally disposed cylindrical boss portion thereof to provide seats for the outside races of ball bearings 42 at least one of which is of the combined radial and thrust type. A shaft 43 extending crosswise and above overarm 34 and to which is keyed the worm 44 is journaled in these ball bearings and has a thrust shoulder 45 which together with a spacer collar 46 serves to transmit the axial thrusts of worm 44 in both directions to the inner races of ball bearings 42 which are retained at threaded portions of shaft 43 by end nuts 58. The outer races of the ball bearings are axially retained by end rings 47 and 48 secured to the cylindrical portion of cap member 39 by screws 49. An intermediate thrust ring 57 takes the inward axial thrust of one outer ball bearing race. A worm wheel 50 surrounds the overarm 34 and is slidably splined thereto by the key 51 which snugly fits a keyway 52 in the worm 44 and slidingly engages a keyway 53 extending, if desired, the entire length of overarm 34. Fig. 6 shows that the worm wheel 50 and the key 51 are retained in alignment with cutout 40 in the turret head by the partition walls 32 so that the worm wheel is retained in proper position to mesh with worm 44 for rotating the overarm 34 in its bearings 33 any desired degree which may accurately be measured and made known by a series of graduations 54 marked on the outside surface of one of the end walls 31 and about the overarm. The latter may have an index line to register with said graduations, extending if desired, the entire length of the arm, or the keyway 53 itself, may serve this purpose. In every rotative position of the overarm 34, this arm is free to be shifted lengthwise of the turret head to any desired extent when the draw bolts 36 are loosened. Squared or splined ends 55 on the shaft 43 are adapted to receive the hand wheel 56 for manually adjusting the rotative position of the overarm 34. Hand wheel 56 is thus usable for rotating the overarm and thereby swinging the axis of the high speed rotary cutter 61, hereinafter referred to, while the latter is machining its work. In Figs. 18 and 19, rotating the overarm 34 by means of handwheel 56 will cause cutter 61 to generate an arcuate groove.

The work machining unit, which may be supported entirely from the overarm 34 according to the present improvements, may be of any desired type involving a spindle 60 for holding any suitable machining tool 61 such as a drill, milling cutter, grinding wheel, or the like. Spindle 60 is powered for rotation by any suitable means as a motor 62 usually connected thereto by change speed pulleys 63 and 64 and by a power transmission belt 65. To comprise a structural unit, removable as such from the articulated support structure by which it is carried, the movable parts of this machining unit may be carried by a common frame structure 66 a portion of which provides slide bearings 67 for a tool feeding sleeve 68 cooperative with the adjustable stop 59 (Fig. 5), which sleeve carries anti-friction bearings (not shown) in which the tool spindle 60 is journaled and through the medium of which the tool spindle may be thrust axially into cutting relation to the work in unison with corresponding axial travel of sleeve 68 by manual pressure on the tool feeding handle 69 which rotates the spur gear 70 enmeshed with rack teeth 71 on the tool feeding sleeve 68. A more finely controlled, or micrometric, feeding of the tool axially against the work may be accomplished by the hand wheel 72 through disconnectable worm and worm wheel drive of the shaft which carries gear 69, but as this part of the mechanism constitutes only means for feeding the tool usable in addition to the feeding handle 69, it need not here be described in further detail.

Fig. 5 shows a preferred construction of swiveled and hinged joints by which the yoke member 76 of the articulated supporting structure for the work machining unit is attached respectively thereto and to the overarm 34. The overarm may comprise either a solid part of a hollow casting, its end portion in Fig. 5 appearing as of hollow construction and presenting spaced longitudinal walls each having a flat exterior surface contacting with one of the inner flat surfaces of the fork flanges 79 and 80 of the yoke member 76. The unthreaded shank portion of a hinge bolt 81 snugly and rotatively fits the aligned holes in flange 79 and in wall 77 of the overarm. The portion of this same bolt passes through a clearance hole in wall 78 of the overarm and has threaded engagement with the flange 80 or with an internally threaded bushing 82 fixedly embedded in said flange 80 and preferably of material harder than that of the overarm.

Yoke member 76 has its extreme right marginal end formed with an exterior cylindrical periphery marked with graduations 83 and at this same end the yoke member terminates in a flat face from which centrally projects the circular bearing boss 84 around which is cut in the yoke member an annular groove 85 of T-shaped cross section constraining the slidable heads of fastening bolts 86 whose shanks extend respectively through a number of lugs such as 87 formed in the housing structure 66 of the self-powered machining unit. Nuts 88 serve to hold the housing structure 66 clamped against the right end of yoke member 76 and this housing structure is provided with a circular recess receiving and rotatively fitting the bearing boss 84 of the yoke member so that when nuts 88 are loosened the entire work machining unit may be swiveled through 360 degrees movement relative to yoke member 76, the degree of its adjustment being accurately measured and made known by the graduations 83 and by some suitable index mark on the casing structure 66 which sweeps around in register therewith.

While in practice the hinge bolt 81 is found to be fully capable of tightening the joint between overarm 34 and yoke member 76 sufficiently to hold the latter in immovable relation to the overarm while the tool 61 is machining the work, there may be provided, if desired, additional means to lock the yoke member against accidental displacement from the setting to which it is swung on the overarm. For this purpose Fig. 5 shows a hole in the wall 78 of the overarm engaged by the inner end of a lock plunger 89 which is outwardly retracted by a knob handle 90 against the resistance of spring 91. A series of such holes may be arranged in the wall of the overarm in a circumferential arc described about the axis of hinge bolt 81 as a center and spaced a suitable number of degrees apart. The yoke member may swing somewhat more than 180 degrees relative to the overarm and has graduations 74 marked on the curved edge of yoke flange 79 and/or of flange 80 cooperative with an index mark on the overarm surface for measuring and making known the number of degrees of angular inclination of the yoke relative to the overarm.

Observation of Figs. 1 and 3 will make clear that the second section 76 of the articulated support structure is coupled both to the overarm 34 and to the machining unit 66 in a manner enabling the axis of tool 61 to be maintained selectively parallel to the axis of overarm 39, as shown in Figs. 18 and 19, or in oblique relationship to said overarm axis as shown in Figs. 17 and 20. Also the drawings show that the pivotal axis of the swivel joint at 84 is contained in a plane perpendicular to the axis of tool 61 and is also contained in a (possibly different) plane perpendicular to the axis of hinge bolt 81. More specifically said axis of the swivel joint 84 is shown to be perpendicular to said axis of tool 61 and also perpendicular to said axis of hinge bolt 81. The drawings further show that the axis of hinge bolt 81 intersects the axis of overarm 34.

Referring now to Figs. 11 to 20, inclusive, an example of an elongated piece of work W to be machined at different extremities thereof, and at various angles, is represented in Figs. 11 and 12 and in this piece of work has been drilled twelve holes 100 to 111, inclusive, of which holes 100 to 103, inclusive, may be drilled by the machining unit when supported in positions represented, respectively, in Figs. 13 to 16, inclusive, while holes 104 to 107, inclusive, may be drilled by the machining unit when supported in positions represented respectively in Figs. 17 to 20, inclusive. With further reference to Figs. 13 to 16, inclusive, it is pointed out that the elongated piece of work W may be reached for the drilling of end holes such as 100 and 103 therein when occupying a well balanced position with approximately equal portions of its weight distributed in off-hung relation to the vertical center of the support knee for the work table. I may refer to that portion of the entire length of the work holding table which contributes to the support of the work as the used length of the work table.

No other machine tool of the character herein concerned has to my knowledge been capable of performing all of the operations indicated in Figs. 11 to 20, inclusive, without change in setup of the work on the work table. It is further pointed out that combined with a long reach in varied directions from the standard and with universal ability to dispose and feed the tool at any desired angle in every possible relation to the work, the work machining unit is sturdily supported against vibration and accidental disturbance in every position to which it may be adjusted. For simplicity of illustration, Figs. 11 to 20, inclusive, represent boring or drilling operations but it will be understood that the sturdiness of the machining unit and its articulated support structure is such that any kind of milling cutter, grinding wheel, or other kind of machining tool, may be employed in place of tool 61 and flat or curved surfaces thereby machined in the work throughout the entire range of operations possible to the illustrated tool 61.

As the advantages of this invention may be embodied in parts and arrangements differing in detail from those herein illustrated for teaching the principles of the improvements, the accompanying claims are intended to define and cover all substitutes and equivalents that would be suggested to persons skilled in this art by the entire disclosure hereof and are not to be limited beyond the widest scope and meaning attributable to their terms.

I claim:

1. In a machine tool of the type including a frame standard and a work holding table movably joined to said standard in a manner to feed work in at least one predetermined path of movement relative thereto, the combination with said standard and table, of a self powered work machining unit including a driven tool holder rotatable upon its work machining axis and adapted to be variously stationed in relation to said path of work feeding movement, bearing structure supported by said frame standard, and an articulated structure for supporting said machining unit at various stations for operating on the work including at least two support sections, the first of said sections comprising an elongated rigid member journaled in said bearing structure in a manner to be slidable lengthwise as well as rotatable about its longitudinal axis relative thereto, and the second of said sections being coupled adjustably both to said first section and to said machining unit in a manner enabling said work machining axis of said tool holder to be maintained selectively in parallel or oblique relationships to said longitudinal axis of said rigid member while operating upon the work.

2. In a machine tool of the type including a frame standard and a work holding table movably joined to said standard in a manner to feed work in at least one predetermined path of movement relative thereto, the combination with said standard and table, of a self powered work machining unit including a driven tool holder rotatable upon its work machining axis and adapted to be variously stationed in relation to said path of work feeding movement, bearing structure supported by said frame standard, and an articulated structure for supporting said machining unit at various stations for operating upon the work including at least two support sections, the first of said sections comprising an elongated rigid member journaled in said bearing structure in a manner to be slidable lengthwise as well as rotatable about its longitudinal axis relative thereto, the second of said sections being hinged to said first section in a manner permitting said second section to be swung adjustably relative to said first section about a hinge axis contained in a plane perpendicular to said longitudinal axis of said first section, and the said machining unit being rotatably coupled to said second section in a manner permitting said unit to be swung adjustably relative to said second section about a pivotal axis contained in a plane perpendicular to said work machining axis of the tool holder and contained also in a plane perpendicular to said hinge axis.

3. In a machine tool of the type including a frame standard and a work holding table movably joined to said standard in a manner to feed work in at least one predetermined path of movement relative thereto, the combination with said standard and table, of a self powered work machining unit including a driven tool holder rotatable upon its work machining axis and adapted to be variously stationed in relation to said path of work feeding movement, bearing structure supported by said frame standard, and an articulated structure for supporting said machining unit at various stations for operating upon the work including at least two support sections, the first of said sections comprising an elongated rigid member journaled in said bearing structure in a manner to be slidable lengthwise as well as rotatable about its longitudinal axis relative thereto, the second of said sections being hinged to said first section in a manner permitting said second section to be swung adjustably relative to said first section about a hinge axis perpendicular to said longitudinal axis of said first section, and the said machining unit being rotatably coupled to said second section in a manner permitting said unit to be swung adjustably relative to said second section about a pivotal axis perpendicular to said work machining axis of the tool holder and also perpendicular to said hinge axis.

4. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard, and an articulated structure for supporting said machining unit in various stations for operating on the work including at least two support sections, the first of said sections including an elongated cylindrical arm journaled in said bearing structure in a manner to be axially slidable as well as rotatable relative thereto, and the second of said sections being coupled adjustably to said machining unit and including a bracket portion swingably fitted and connected to the end of said arm, together with a hinge pin pivotally coupling said arm and bracket the axis of said hinge pin intersecting the axis of said arm.

5. In a machine tool of the type including a frame standard and a work holding table movably joined to said standard in a manner to feed work in at least one path of movement relative thereto, the combination with said standard and table of a self-powered work machining unit including a driven tool holder and adapted to be variously stationed in relation to said path of work feeding movement, an articulated structure for supporting said machining unit in various stations for operating on the work including at least two support sections, the first of said sections comprising a longitudinally slidable arm mounted on said frame standard in rotatably adjustable relation thereto and in a manner to reach from said standard to either extreme end of the used length of said work holding table when said used length of said table extends equal distances in opposite lateral directions relative to said frame standard, and the second of said sections being coupled adjustably both to the said first section and to said machining unit.

6. In a machine tool of the type including a frame standard and a work holding table movably joined to said standard in a manner to feed work in at least one path of movement relative thereto, the combination with said standard and table of a self-powered work machining unit including a driven tool holder adapted to be variously stationed in relation to said path of work feeding movement, an articulated structure for supporting said machining unit in various stations for operating on the work including at least two support sections, the first of said sections comprising a longitudinally slidable arm mounted on said frame standard both in rotatable and swingable relation thereto thereby to reach from said standard to either extreme end of said work holding table when the length of said table extends equal distances in opposite lateral directions relative to said frame standard, and the second of said sections being coupled adjustably both to the said first section and to said machining unit.

7. In a machine tool including a frame standard, a turret head mounted on said standard, an overarm journaled in and projecting from said turret head, a worm wheel slidably splined to said overarm, and a worm member journaled in said turret head in position to mesh with said worm wheel.

8. In a machine tool of the type including a frame standard and a work holding table movably joined to said standard in a manner to feed work in at least one path of movement relative thereto, the combination with said standard and table of a self-powered work machining unit including a driven tool holder and adapted to be variously stationed in relation to said path of work feeding movement, a turret head mounted on the top of said frame standard in a manner to swivel relative thereto about a vertical axis, and an articulated structure for supporting said machining unit in various stations for operating on the work, including an elongated arm journaled in said turret head and reaching toward said work holding table, a support section coupled adjustably both to said elongated arm and to said machining unit, and gearing carried by said turret head constructed and arranged to turn said support arm upon its own longitudinal axis to different rotative positions while permitting said arm both to be longitudinally adjusted and also to be swung about in a manner to extend in various directions relative to said frame standard in each of said different rotative positions.

9. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard constructed and arranged to swivel about a vertical axis relative thereto, and an articulated structure for supporting said machining unit in various stations for operating on the work including at least two support sections, the first of said sections comprising an elongated arm journaled in said bearing structure in a manner to be axially slidable as well as rotatable relative thereto and the second of said sections being coupled adjustably both to the said first section and to said machining unit, together with gearing carried by said bearing structure constructed and arranged to turn said support arm upon its own longitudinal axis to different rotative positions while permitting said arm to be longitudinally adjusted and swung to extend in various directions relative to said frame standard in each of said positions.

10. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard constructed and arranged to swivel about a vertical axis relative thereto, and an articulated structure for supporting said machining unit in various stations for operating on the work including at least two support sections, the first of said sections comprising an elongated rigid arm journaled in said bearing structure in a manner to be axially slidable as well as rotatable relative thereto and the second of said sections being coupled adjustably both to the said first section and to said machining unit, together with a worm wheel slidably mounted on said arm in fixed rotative relation thereto, and a worm in mesh with said wheel rotatably carried by said bearing structure.

11. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard, and an articulated structure for supporting said machining unit in various stations for operating on the work including at least two support sections, the first of said sections comprising an elongated rigid arm journaled in said bearing structure in a manner to be axially slidable as well as rotatable relative thereto and the second of said sections being coupled adjustably both to the said first section and to said machining unit, together with a worm wheel slidably mounted on said arm in fixed rotative relation thereto, and a worm in mesh with said wheel rotatably carried by said bearing structure.

12. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard, and an articulated structure for supporting said machining unit in various stations for operating on the work including at least two support sections, the first of said sections comprising an elongated rigid arm journaled in said bearing structure in a manner to be axially slidable as well as rotatable relative thereto and the second of said sections being coupled adjustably both to the said first section and to said machining unit, together with a worm wheel operatively connected to said arm, and a worm in mesh with said wheel rotatably carried by said bearing structure in crosswise relation to said arm.

13. In a machine tool, the combination with a frame standard having a head structure containing a cutout extending across its central upper portion and containing horizontally aligned bores, of an overarm journaled in said bores and extending through said cutout in said head structure in crosswise relation thereto, and a detachable cap member fitting said cutout in the head structure thereby to cover and render accessible the portion of said overarm occupying said cutout.

14. In a machine tool, the combination defined in claim 13, together with helical gear teeth located within the said cutout in the head structure for rotating the said overarm, and a worm rotatively supported by the said cap member in position to mesh with said teeth.

15. In a machine tool, the combination defined in claim 13, together with a worm wheel rotatively fixed on said overarm within the said cutout in the head structure, and a worm rotatively supported by the said cap member in position to mesh with said worm wheel.

16. In a machine tool, the combination defined in claim 13, together with a worm wheel slidably splined to the said overarm within the said cutout portion of the head structure, and a worm member rotatively journaled in the said cap member in position to mesh with said worm wheel.

17. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard, and an articulated structure for supporting said machining unit in various stations for operating on the work including at least two support sections, the first of said sections being journaled in said bearing structure in a manner to be axially slidable as well as rotatable relative thereto, and the second of said sections being coupled adjustably to said machining unit and including a forked structure having spaced arms straddling and hinged to said first support section.

18. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard, and an articulated structure for supporting said machining unit in various stations for operating on the work including at least two support sections, the first of said sections including an elongated cylindrical arm journaled in said bearing structure in a manner to be axially slidable as well as rotatable relative thereto and having a slabbed end portion, and the second of said sections being coupled adjustably to said machining unit and including a forked bracket hinged to said slabbed end portion of said arm.

19. In a machine tool of the type including a frame standard and a work holding table movably joined to said standard in a manner to feed work in at least one predetermined path of movement relative thereto, the combination with said standard and table, of a self powered work machining unit including a driven tool holder and adapted to be variously stationed in relation to said path of work feeding movement, bearing structure supported by said frame standard, and an articulated structure for supporting said machining unit in various stations for operating on the work including at least two support sections, the first of said sections including an elongated cylindrical arm journaled in said bearing structure in a manner to be axially slidable as well as rotatable relative thereto and having its opposite ends slabbed, and the second of said sections being coupled adjustably to said machining unit and including a forked bracket hinged to one of said slabbed ends of said arm.

20. In a machine tool of the type including a frame standard and a work holding table movably joined to said standard in a manner to feed work in at least one predetermined path of movement relative thereto, the combination with said standard and table, of a self-powered work machining unit including a driven tool holder adapted to be variously stationed in relation to said path of work feeding movement, bearing structure supported by said frame standard, and an articulated structure for supporting said machining unit at various stations for operating upon the work including at least two support sections, the first of said sections being journaled in said bearing structure in a manner to be axially slidable as well as rotatable about its axis relative thereto, and the second of said sections comprising a disc-like body with spaced arms extending therefrom straddling and hinged to the said first support section, together with means to couple said disc-like body in swiveled relation to the said work machining unit.

21. In a machine tool, the combination with a frame standard having niches sunken inwardly from the external surface of its lateral walls at points spaced from the top surface of the standard and having one or more bolt holes extending from said top surface of the standard into one or more of said niches, of a turret head structure having a bottom surface seated rotatably on said top surface of said frame standard and having an annular groove of T-shaped cross section opening through said bottom surface in register with said bolt holes.

22. In a machine tool, the combination defined in claim 21 in which the said turret head structure has a passageway of T-shaped cross section corresponding to the said annular groove and opening thereinto and extending laterally away therefrom, thereby to enable the head of a fastening bolt to be withdrawn laterally from said groove when the said turret head structure is removed from the said frame standard.

23. In a machine tool, the combination defined in claim 21, in which the said turret head structure has a passageway of T-shaped cross section corresponding to the said annular groove and opening thereinto and extending laterally away therefrom, thereby to enable the head of a fastening bolt to be withdrawn laterally from said groove when the said turret head structure is removed from the said frame standard, together with an opening large enough to pass the head of the bolt extending from the said bottom surface of the turret head structure to said passageway at a point laterally spaced from said annular groove.

RUDOLPH F. BANNOW.